Patented Dec. 2, 1941

2,264,756

UNITED STATES PATENT OFFICE 2,264,756

SEPARATION OF MAGNETIC CATALYSTS FROM RESINS AND OTHER POLYMERS

William D. Johnston, Jr., Bellevue, Pa., assignor to The Neville Company, Pittsburgh, Pa., a corporation of Pennsylvania No Drawing. Application April 12, 1940, Serial No. 329,304

7 Claims. (Cl. 260—81)

This invention relates to the separation of finely divided magnetic catalysts from hydrogenated resins and oils, and, generally, from hydrogenated polymers.

There are many instances where finely divided catalysts susceptible to magnetic forces must be separated from a liquid medium comprising hydrogenated polymers such, for example, as hydrogenated resins and polymeric oils. The standard way of accomplishing this in commercial operations is by means of filters of one type or another. Such operations may be objectionable because, for example, the filtration may be slow due to the formation of dense cakes of solid, because the filter or filter press must be cleaned at frequent intervals, because the initial cost of such apparatus may be quite high, because the filter cloth or filtering medium must be renewed frequently, because of unavoidable loss of filtrate, and for related reasons. These items increase filtration costs with consequent burden upon the cost per unit of product, and this coupled with the original apparatus costs may place a considerable burden upon materials which from their nature must be sold at low prices.

Such features apply to all such mechanical filtration operations, i. e., in the hydrogenation of polymer oils, resins, and similar materials in liquid form or in solution which must be freed from finely divided magnetic catalysts in suspension. For instance, in the hydrogenation of coumarone-indene resins, sometimes called coumarone or paracoumarone resins, such filtration may require from two to four hours for completion, coupled with the loss of from 5.5 to 7 per cent by volume of the filtrate.

The major objects of the invention are to overcome the foregoing and related disadvantages encountered heretofore in the separation of finely divided magnetic catalysts from hydrogenated resins, polymer oils, and other polymers, and particularly to provide accelerated, simplified and efficient separation of such finely divided materials from such liquid suspensions, and especially from coumarone-indene resin and coumarone-indene heavy oils, which is simple, easily performed, rapid, inexpensive, highly efficient, and avoids the disadvantages heretofore encountered in such operations.

A particular object is to provide a process of the type referred to which dispenses with the necessity for using expensive and elaborate mechanical filters, and requires only inexpensive apparatus that is easily used, reduces costs and losses to a minimum, and does not interfere with normal plant operations.

The invention is predicated upon my discovery that the settling and removing of finely divided catalysts susceptible to magnetic influences from hydrogenated polymer oils, resins, or their solutions may be greatly accelerated and simplified, and rendered less expensive and freer from loss, by subjecting the suspension to the influence of a magnetic field. Thereby the catalyst is conditioned for separation from the liquid more readily and at a greatly accelerated rate as compared with a suspension of the same material which has not been so treated. Such exposure to a magnetic field seems to cause the particles of solid matter to agglomerate, or flocculate, thus presenting larger and heavier masses with a decreased ratio of surface to mass which settle rapidly and which, if filtered, do not compact into dense cakes. Whether or not such flocculation, or agglomeration, actually occurs, the facts are that the catalyst settles or may be filtered much more rapidly, easily and efficiently than is the case without treatment according to this invention, and the catalyst when collected has a somewhat greater settled bulk. Also, these effects persist for long periods of time after treatment.

In the practice of the invention it is necessary only to expose the liquid suspension to a magnetic field for a short period of time, for example by causing it to flow through a magnetic field, which appears to exert its influence almost instantaneously. Thus a conduit which conveys the suspension from a treating vessel may be surrounded with a coil of wire supplied with direct current to form a solenoid. Or, a settling tank, treating vessel, or the like may be similarly encircled by a solenoid coil. The invention may, of course, be practiced in other ways, as will be understood.

The effect of such treatment of a hydrogenated polymer oil, resin or other polymer, or of a solution thereof, is to cause filtration, for instance in a filter press, to proceed more rapidly and more easily, and with formation of less dense cakes, than is attainable without such subjection to a magnetic field. I have found, however, that the influence of the magnetic field in accelerating and causing substantially complete settling is so profound that generally it is most desirable, expedient and economical merely to permit settling after exposure to the magnetic field, and then to separate the supernatant liquid and the settled catalyst, e. g., by decantation. Any residual catalyst remaining in the supernatant oil, resin or solution thereof can then be removed by a simple polishing filtration step, e. g., by merely passing it through a filtering medium of appropriate filtering characteristics, and this is accomplished quickly, easily and cheaply because the amount of residual catalyst is extremely small as compared with that initially present. This is in marked contrast with the use of vacuum, plate and frame and other mechanically assisted filters which involve the use of more or less large and expensive apparatus. Thus in the separation of spent nickel catalyst from solutions of hydrogenated coumarone-indene resin such a polishing filtration step is required to remove only one unit of catalyst as compared with 278 units if standard filter press practice be applied without the use of this invention.

The invention may be described further with particular reference to the removal of spent nickel catalyst that has been used to effect hydrogenation of coumarone-indene resins or coumarone-indene heavy oils, or solutions thereof. By actual experience I have found that through the practice of the invention the same degree of settling is attained in fifteen minutes that requires four hours without such treatment. Furthermore, the greatly accelerated settling effect resultant from exposing such suspensions to a magnetic field persists over a period of at least sixteen hours, and the settling is more rapid than without treatment even after longer periods.

In the practice of the invention as applied to the separation of nickel from hydrogenated coumarone-indene resins or heavy oils, or solutions thereof, the hydrogenated material carrying the nickel in suspension is withdrawn from the hydrogenating vessel into a settling tank provided with a decanting side outlet and a removable bottom. The conduit leading from the hydrogenator to the settling tank is fabricated with at least a section made from copper, which section is used as a core upon which an ironclad solenoid is wound which is supplied with direct current so that the suspension as it passes through the conduit is exposed for a brief interval to a magnetic field. After the contents of the hydrogenator have entered the settler the mixture is permitted to settle for a short time, say fifteen minutes, after which there may be decanted a supernatant solution substantially free from nickel or containing at most about 200 parts of catalyst per million parts of liquid of which at least about 40 per cent by weight are nonmagnetic impurities present in such catalysts so that they are not affected by magnetic treatment. The decanted supernatant liquid may then be freed from any residual nickel by passing it through a simple filter, for example, a filter of the cartridge type used with automotive vehicles for filtering crankcase oil. The nickel mud is removed from the tank by opening the removable bottom.

The use of filter presses and similar complex and mechanical filtration and mechanical separation devices, such as centrifuges, is thus eliminated by the practice of the invention with consequent saving in overhead expenses and the time and cost of operating such apparatus. Also, due to the prolonged ability of the treated material to settle rapidly there is no danger of peptization of the catalyst should it be not possible or not convenient to effect separation at once, or if the settled material becomes agitated, prompt and efficient settling follows.

Although the invention has been described with particular reference to coumarone-indene resins and heavy oils, and to separating nickel catalyst used for hydrogenating them, it will be understood that it is applicable generally to the separation of finely divided magnetic catalysts in suspension in hydrogenated resins, oils, polymers generally, or mixtures thereof which may be rendered liquid by fusion or by solution in a suitable solvent, or are themselves liquid at atmospheric temperatures. The term "liquid state" is used in the claims to comprehend broadly such conditions, i. e., treatment in the liquid condition of polymers which are liquid at atmospheric temperature or have been liquefied by fusion, or which are effectively liquid through having been dissolved in a solvent. Examples of such magnetic materials which may be encountered are iron, steel, nickel, cobalt, manganese, magnetic alloys such, for example, as silicon steel, cobalt-tungsten-chrome steels, and the like, ferric hydroxide, manganese oxide, and many others.

As exemplifying the benefits to be derived from the practice of the invention reference may be made to the following tests.

*Test 1.*—100 cc. of a suspension of 7 grams of finely divided metallic nickel (Raney) catalyst in 150 grams of a 60 per cent by weight solution of hydrogenated coumarone-indene resin in petroleum benzine were heated to 70° C. and placed in a 100 ml. graduate 1 inch in diameter. The graduate and its contents stood undisturbed in a vertical position. At the end of one hour the upper 30 cc. portion of the liquid was transparent although still flecked with fine nickel particles, while the lower 70 cc. portion was black and opaque. The graduate and its contents were then exposed for fifteen to twenty seconds to a magnetic field generated by a direct current solenoid. Upon removal from the magnetic field the upper 90 cc. portion of the graduate contents was perfectly clear and transparent, and one hour after exposure, at room temperature, the settled nickel volume was 2.5 cc. and the balance of the contents of the graduate was perfectly clear and transparent.

*Test 2.*—In this test two 100 ml. glass graduates were filled with a suspension of 14 grams of finely divided nickel catalyst in 300 grams of a 60 per cent by weight solution of hydrogenated coumarone-indene resin in petroleum benzine at a temperature of 75° C. One graduate was exposed to a magnetic field for about fifteen seconds, and the other was not given this treatment. Both graduates were then set in a water bath maintained at about 80° C. Observations were made as follows:

| Elapsed time | Volume per cent of clear solution | |
|---|---|---|
| | Magnetized sample | Unmagnetized sample |
| | Per cent | Per cent |
| 0 hour | 0 | 0 |
| ¼ hour | 96½ | 1 |
| ½ hour | 96½ | 2 |
| 1 hour | 96½ | 3 |

Both graduates were now removed from the bath and allowed to cool and stand. After one and one-half hours of cooling and settling only 15 per cent of liquid in the untreated graduate was clear, and it required fifteen hours for this suspension to settle to an amount (96.5%) corresponding to that attained within fifteen minutes after exposure of the other graduate to the magnetic field.

Both graduates were now thoroughly shaken to determine the persistence of the effect of exposure to a magnetic field. The contents of the graduates were then permitted to settle at room temperature, with the following results:

| Elapsed time | Volume per cent of clear solution | |
|---|---|---|
| | Magnetized sample | Unmagnetized sample |
| | Per cent | Per cent |
| 0 hour | 0 | 0 |
| 1 hour | 97 | 1 |
| 2 hours | 97 | 5 |
| 2½ hours | 97 | 35 |

Although the heavy oils referred to are not solids, they are polymers related to the hard resins and are thus related thereto, for which reason they are included in the term "resinous polymers" used in the claims for brevity.

The invention has been applied with like advantages to the separation of magnetic catalysts from solutions of other polymers and resins. For example, similarly desirable results have been attained by applying the invention to the separation of hydrogenation catalyst from a solution of hydrogenated rubber, and from solutions in petroleum benzine of hydrogenated rosin (60 per cent solution), hydrogenated phenol-modified coumarone-indene resin (60 per cent solution), hydrogenated cyclopentadiene resin (60 per cent solution), and dihydromethyl abietate (85 per cent solution).

An ancillary, but important, advantage is that the invention makes possible the use of inert atmospheres in its practice. This is not always practicable or economically feasible with filter presses because if not sufficiently large they may have to be opened during filtration of a batch.

According to the provisions of the patent statutes, I have explained the principle and method of practicing my invention and have described what I now consider to represent its best embodiment. However, I desire to have it understood that, within the scope of the appended claims, the invention may be practiced otherwise than as specifically described.

I claim:

1. That method of accelerating separation of a finely divided catalyst susceptible to magnetic influence from a suspension thereof in a hydrogenated polymer in a liquid state which comprises subjecting the liquid suspension to the influence of a magnetic field and thereby conditioning said catalyst while freely suspended therein for rapid settling in a form easily separable from the liquid and without further exposure to said field, then allowing the conditioned catalyst to settle out, and separating the liquid and the thus-conditioned catalyst.

2. A process according to claim 1 in which the liquid and catalyst are separated by decantation of the supernatant liquid.

3. A process according to claim 1 in which the supernatant liquid is subjected after separation from the settled catalyst to a simple polishing filtration to separate residual catalyst from the liquid.

4. A process according to claim 1 in which the supernatant liquid is decanted from the settled catalyst and is then subjected to a simple polishing filtration to separate residual catalyst therefrom.

5. A method according to claim 1, said field being of constant polarity.

6. A method according to claim 1, said hydrogenated polymer being hydrogenated coumarone-indene resin.

7. A method according to claim 1, said hydrogenated polymer being hydrogenated coumarone-indene heavy oil.

WILLIAM D. JOHNSTON, Jr.